US012327095B2

(12) United States Patent
Truong et al.

(10) Patent No.: US 12,327,095 B2
(45) Date of Patent: Jun. 10, 2025

(54) SYSTEMS AND METHODS OF DECOMPOSING USER EXPERIENCE COMPONENTS INTO FUNCTIONING SUBCOMPONENTS

(71) Applicant: Salesforce, Inc., San Francisco, CA (US)

(72) Inventors: Brian Truong, San Francisco, CA (US); Billy Ma, San Francisco, CA (US)

(73) Assignee: Salesforce, Inc., San Francisco, CA (US)

( * ) Notice: Subject to any disclaimer, the term of this patent is extended or adjusted under 35 U.S.C. 154(b) by 172 days.

(21) Appl. No.: 18/136,904

(22) Filed: Apr. 20, 2023

(65) Prior Publication Data
US 2024/0354072 A1    Oct. 24, 2024

(51) Int. Cl.
G06F 8/38    (2018.01)
G06F 8/20    (2018.01)
G06F 8/36    (2018.01)

(52) U.S. Cl.
CPC .............. *G06F 8/38* (2013.01); *G06F 8/20* (2013.01); *G06F 8/36* (2013.01)

(58) Field of Classification Search
CPC .............. G06F 8/38; G06F 8/20; G06F 8/36
USPC .................................................. 717/104–121
See application file for complete search history.

(56) References Cited

U.S. PATENT DOCUMENTS

| 5,737,559 | A * | 4/1998 | Orton | G06F 8/24 715/807 |
| 6,496,202 | B1 * | 12/2002 | Prinzing | G06F 8/38 715/762 |
| 7,017,143 | B1 * | 3/2006 | Andrew | G06F 9/451 715/713 |
| 7,461,382 | B2 * | 12/2008 | Hammerich | G06F 9/542 715/744 |
| 7,873,946 | B2 * | 1/2011 | Lathrop | G06F 16/56 717/109 |
| 8,566,792 | B2 | 10/2013 | Chasman | |

(Continued)

OTHER PUBLICATIONS

Markelov et al, "Repository of User Interface Controls in area of Electronic Design Automation Software for Usability Improvement", IEEE, pp. 314-315 (Year: 2011).*

(Continued)

*Primary Examiner* — Anil Khatri
(74) *Attorney, Agent, or Firm* — Butzel Long

(57) ABSTRACT

Systems and methods are provided for parsing, at a server, a design file including code for a user interface, where the code is readable by the server into a tree representation having nodes, the nodes represent design elements of the user interface and includes one or more design properties, a unique identifier, and references to child elements. The server traverses the tree representation and comparing the design elements of the tree representation to a set of factors to determine when the design elements and meet a criteria to be a subcomponent for one or more components of the code of the design file. The server adds the design elements to a list of subcomponent candidates that meet at least one of the set of factors to be a subcomponent. The server generates a tree structure for the one or more components using the list of subcomponent candidates.

20 Claims, 6 Drawing Sheets

(56) References Cited

U.S. PATENT DOCUMENTS

| | | | |
|---|---|---|---|
| 8,671,352 B1* | 3/2014 | Hsu | G06T 11/60 |
| | | | 715/762 |
| 8,752,011 B2* | 6/2014 | Dewan | G06F 9/451 |
| | | | 717/113 |
| 9,098,618 B2 | 8/2015 | Chasman | |
| 9,690,808 B2 | 6/2017 | Roy-Faderman | |
| 9,946,989 B2* | 4/2018 | Bhola | G06Q 10/107 |
| 9,973,550 B2 | 5/2018 | Haskins | |
| 10,423,907 B2 | 9/2019 | Wang | |
| 10,489,126 B2* | 11/2019 | Kumar | G06V 30/422 |
| 10,860,296 B2 | 12/2020 | Ma | |
| 11,030,082 B1 | 6/2021 | Ma | |
| 11,086,764 B2 | 8/2021 | Ma | |
| 11,194,786 B2* | 12/2021 | Beveridge | G06F 16/2365 |
| 11,237,889 B1 | 2/2022 | Ma | |
| 11,429,577 B2 | 8/2022 | Ma | |
| 11,436,005 B2 | 9/2022 | Ma | |
| 11,494,286 B2 | 11/2022 | Ma | |
| 11,537,503 B2 | 12/2022 | Chen | |
| 11,573,880 B2 | 2/2023 | Ma | |
| 12,147,388 B1* | 11/2024 | Sharma | G06F 16/13 |
| 12,159,335 B2* | 12/2024 | Harvill | G06T 11/60 |
| 12,248,455 B1* | 3/2025 | Cwalina | G06F 16/182 |
| 2011/0276945 A1 | 11/2011 | Chasman | |
| 2012/0143837 A1 | 6/2012 | Roy-Faderman | |
| 2013/0167122 A1 | 6/2013 | Chasman | |
| 2015/0074558 A1 | 3/2015 | Haskins | |
| 2015/0112745 A1 | 4/2015 | Wang | |
| 2016/0112572 A1 | 4/2016 | Ma | |
| 2017/0199852 A1* | 7/2017 | Sasikumar | G06F 40/177 |
| 2020/0082001 A1 | 3/2020 | Chen | |
| 2020/0249915 A1 | 8/2020 | Ma | |
| 2020/0348925 A1 | 11/2020 | Ma | |
| 2021/0133083 A1 | 5/2021 | Ma | |
| 2021/0149953 A1 | 5/2021 | Garg | |
| 2021/0232480 A1 | 7/2021 | Ma | |
| 2021/0232487 A1 | 7/2021 | Ma | |
| 2021/0232552 A1 | 7/2021 | Ma | |
| 2021/0240597 A1 | 8/2021 | Chen | |
| 2021/0240599 A1 | 8/2021 | Ma | |
| 2022/0050732 A1 | 2/2022 | Ma | |
| 2023/0108375 A1 | 4/2023 | Ma | |

OTHER PUBLICATIONS

Nasiri ert al, "UXUP—User eXperience Centric Unified Process", IEEE, pp. 1-9 (Year: 2018).*

Nguyen et al, "Design Patterns for Parsing", ACM, pp. 1-5 (Year: 2005).*

Zhang et al, "Interval Parsing Grammars for File Format Parsing", ACM, pp. 1-23 (Year: 2023).*

Lutsky', "Using a Document Parser to Automate Software Testing", ACM, pp. 1-5 (Year: 1994).*

Sakka et al, "TreeFuser: A Framework for Analyzing and Fusing General Recursive Tree Traversals", ACM, pp. 1-30 (Year: 2017).*

* cited by examiner

SYSTEMS AND METHODS OF DECOMPOSING USER EXPERIENCE COMPONENTS INTO FUNCTIONING SUBCOMPONENTS

BACKGROUND

Current user experience (UX) design tools for software interface prototyping can generate HTML code for a design created by a user. Such tools do not decompose the code into subcomponents, group the subcomponents or related functionality together, or provide code which promotes reusability and/or separation or responsibilities.

BRIEF DESCRIPTION OF THE DRAWINGS

The accompanying drawings, which are included to provide a further understanding of the disclosed subject matter, are incorporated in and constitute a part of this specification. The drawings also illustrate implementations of the disclosed subject matter and together with the detailed description explain the principles of implementations of the disclosed subject matter. No attempt is made to show structural details in more detail than can be necessary for a fundamental understanding of the disclosed subject matter and various ways in which it can be practiced.

DETAILED DESCRIPTION

Figure 1A:
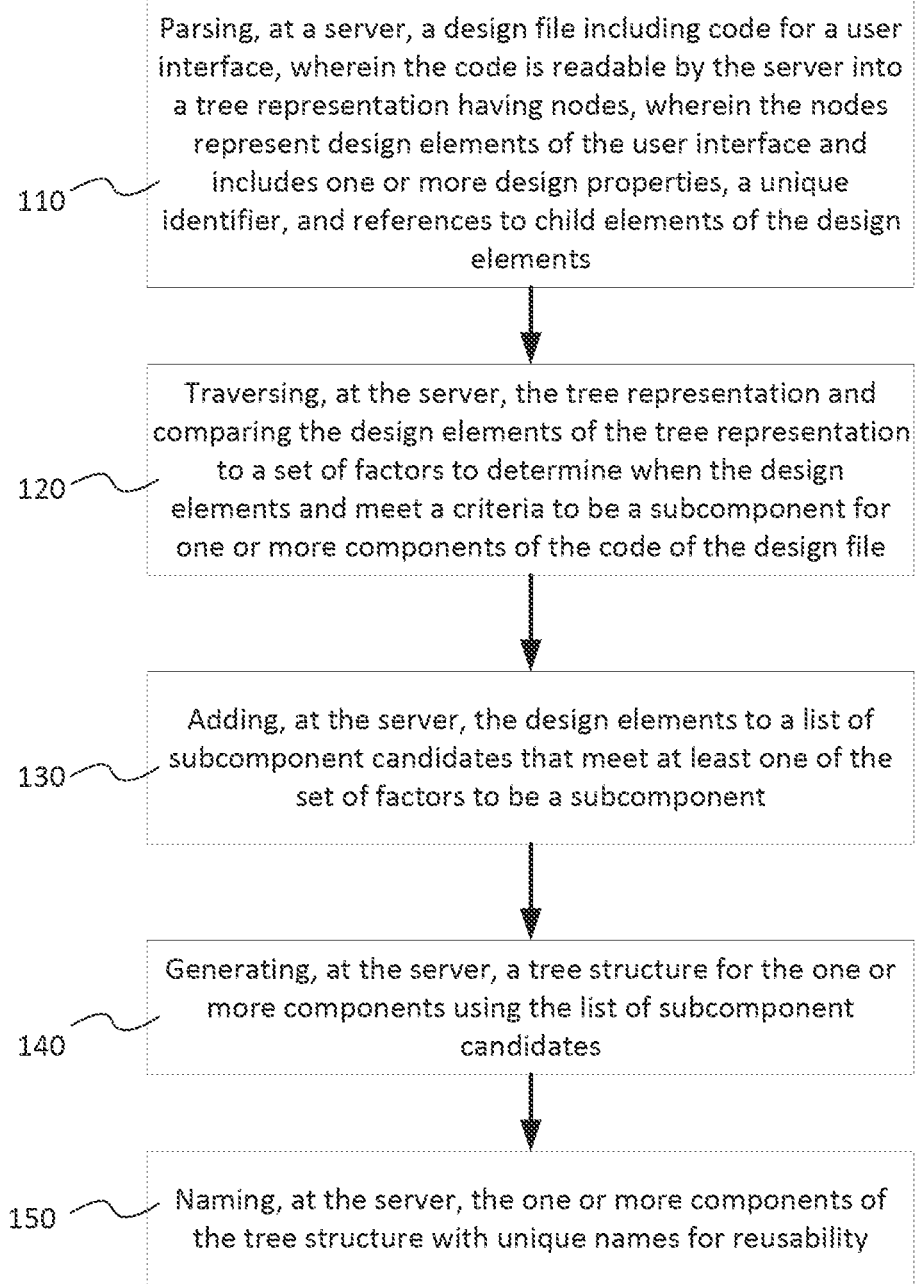
FIGS. 1A-1E show example methods of decomposing user experience components of a user interface into functional subcomponents according to implementations of the disclosed subject matter.

Various aspects or features of this disclosure are described with reference to the drawings, wherein like reference numerals are used to refer to like elements throughout. In this specification, numerous details are set forth in order to provide a thorough understanding of this disclosure. It should be understood, however, that certain aspects of the disclosure can be practiced without these specific details, or with other methods, components, materials, or the like. In other instances, well-known structures and devices are shown in block diagram form to facilitate describing the subject disclosure.

Current user experience (UX) design tools for software interface prototyping allow a designer to create a look of a software interface without being concerned how the design is translated to production-ready software code that is executable by a server or other computing device. Some current UX design tools can generate code (e.g., HTML code) for a design created by a user. However, the code generated by such current UX design tools does not group functionality together, promote reusability, and/or separate responsibilities of functions within the code. Implementations of the disclosed subject matter decomposes the code output by such design tools into subcomponents, groups the subcomponents having related functionality together, and forms subcomponents which promote reusability and/or separation or responsibilities within the code.

In implementations of the disclosed subject matter, code generated by the UX design tool is analyzed across one or more factors, which may be weighted, to output a set of subcomponents that fully retain the original functionality of a component of the code while creating subcomponents.

To generate the subcomponents, implementations of the disclosed subject matter may parse code of a design file generated by the UX design tool into a tree representation, where each node of the tree represents a design element. The tree representation of the design may be traversed, where each element of the tree is compared to the set of factors used to determine if the element meets the criteria to be a subcomponent, and, if so, is added to a list of subcomponent candidates. The inventive concept recursively evaluates the children of the subcomponents in the candidate list to find any further subcomponents, removes duplicates, and merges similar subcomponents. A tree is generated based on the identified subcomponents, and a unique name is provided for reusability. Implementations of the disclosed subject matter may output a primary container component that encapsulates the generated subcomponents, and a component definition may be provided for each subcomponent. The implementations of the disclosed subject matter may determine visual factors from the code of the design file such as position, shape, styling, repetition, and/or complexity of elements, and generate a primary component that includes one or more subcomponents, along with component definitions.

Implementations of the disclosed subject matter improve the operation of a computer by generating subcomponents that provide for separation of responsibilities, which may provide code that is executable by a server and/or other computing device that may be more reusable, maintainable, and/or reliable than code that is output by current UX design tools.

FIGS. 1A-1E show an example method 100 of decomposing user experience components of a design of a user interface into functional subcomponents according to implementations of the disclosed subject matter. At operation 110, a server (e.g., server 700 shown in FIG. 3 and described below) may parse a design file for a user interface. An example user interface is shown in FIG. 2A and discussed below. The design file may include code for a user interface that is readable by the server. The design file may be output by a UX design tool, and may represent a user interface design for a software program that is created by a user of the UX design tool. The UX design tool may be executed by the computer 500 and/or the server 700 shown in FIG. 3. The design file output by the UX design tool may be stored in storage 710 of the server 700 and/or the fixed storage 530, memory 570, and/or the removable media 550 of computer 500 shown in FIG. 3. In operation 110, the server may parse the design file into a tree representation having nodes, where the nodes represent design elements of the user interface and include one or more design properties, a unique identifier, and/or references to child elements of the design elements.

In some implementations, the design properties may include a size of the design elements, a position of the design elements, a type of the design elements, a color of the design elements, and/or interactions with the design elements. The unique identifier may be a name, alphanumeric code, or the like that uniquely identifies a node of the tree representation. The references to child elements may link a node of the tree representation to a child element of the node.

Figure 2A:
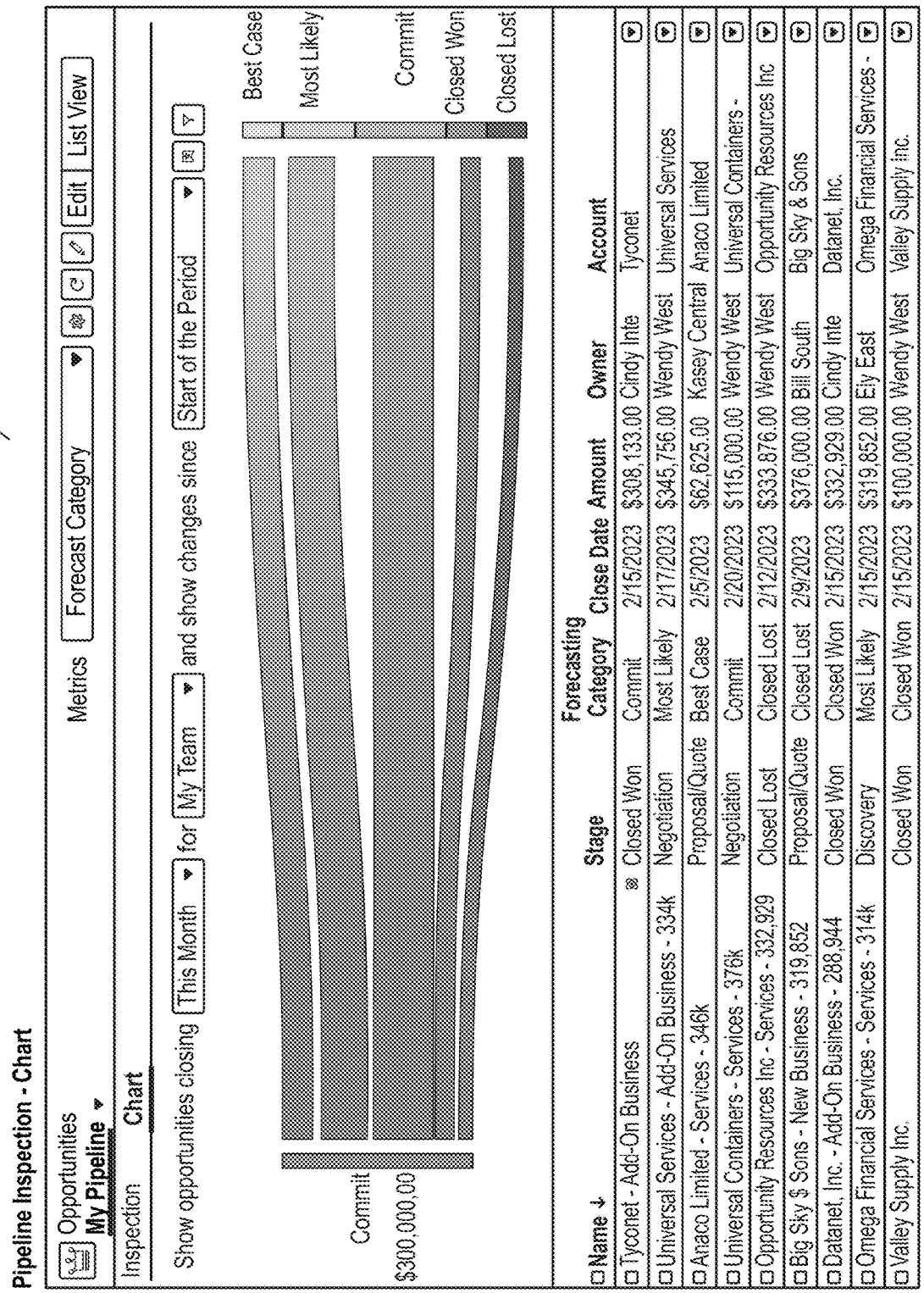
FIG. 2A shows an example design of a user interface according to implementations of the disclosed subject matter.
Figure 2B:
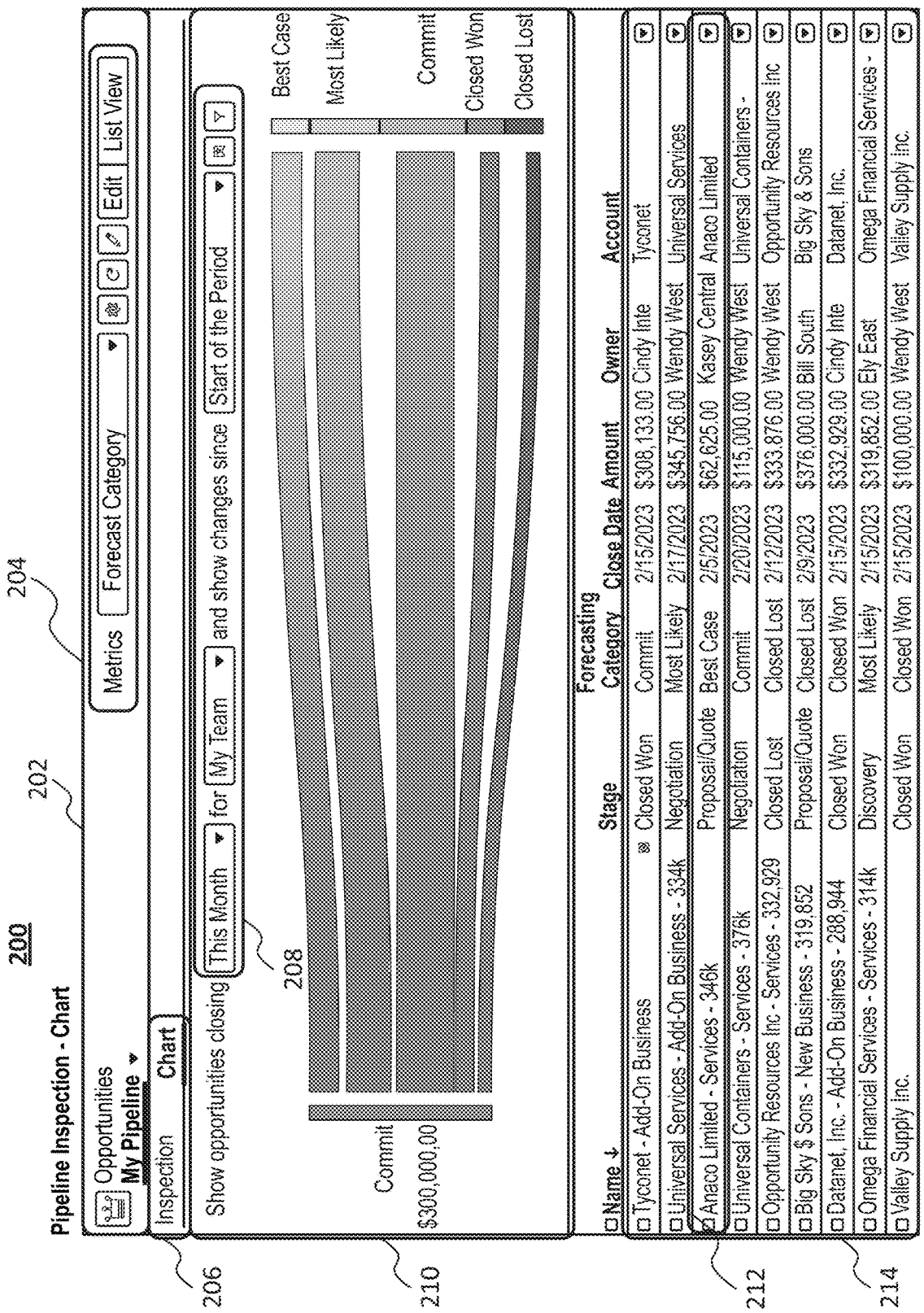
FIG. 2B shows an identification of potential subcomponents of the user interface from the design file using the example methods shown in FIGS. 1A-1E according to implementations of the disclosed subject matter.

At operation 120, the server may traverse the tree representation and compare the design elements of the tree representation to a set of factors to determine when the design elements and meet a criteria to be a subcomponent for one or more components of the code of the design file. FIG. 2B shows a user interface with potential subcomponents identified, as described in detail below.

The set of factors may include visualization of the design elements, functional operation of the design elements, repetition of the design elements, and/or complexity of the design elements.

The visualization factor may include accessibility of the design elements, animation of the design elements, transitions of the design elements, spatial relationship of the design elements, patterns of the design elements, variation of a state of the design elements, and/or conditional rendering of the design elements. These factors are discussed in detail below.

For the visualization factor of accessibility, if an element or group of elements have specific accessibility requirements, such as a screen reader, keyboard navigation, color contrast, voiceover, or the like, a subcomponent may be used to encapsulate the functionality of the element or group of elements. For example, a table with keyboard navigation may be used as a component to provide a consistent experience for an interface design.

For the visualization factor of animations and/or transitions, these elements may be formed subcomponents from the code of the design file so that any logic for the animation and/or transition may be encapsulated and reused.

For the visualization factor of spatial relationships, elements that maintain a predetermined spatial relationship (e.g., alignment, hierarchy, proximity, or the like) may be grouped with one another by the server into a subcomponent. For example, a row of icons that appear equally distanced and horizontally aligned of a user interface design may be grouped together by the server into a subcomponent. In another example, the positioning of header tags (h1, h2) may be used by the server to group elements together in a subcomponent.

The visualization factor of design patterns may include accordions, tabs, modals, headers, and the like that may be grouped together in a subcomponent. Such common design patterns may represent reusable components with distinct functionality.

The visualization factor of variations of state may include when an element appears in different variations that show a plurality of states (e.g., expanded, hover, collapsed, and the like), then the element may be a subcomponent that encapsulates all presented states. This may be used across multiple top-level designs to determine if transitioning from one design to another is based on changing one component's state to a different state.

For the visualization factor of conditional rendering, if an element may be shown based on one or more conditions being true, then the element may be grouped into a subcomponent to support the behavior of the element.

Turning to the functional factor of the set of set of factors, the functional factor may include user interactive elements of the design elements, scalable content of the design elements, data containers of the design elements, and/or a performance value of the design elements.

For the functional factor of user interactive, elements that are specified to have a user interaction (e.g., click, hover, press, and the like) and trigger specific behavior or events may be a subcomponent. This encapsulation of user interactive elements into subcomponents may promote better separation, such a button that opens a directional popup in a user interface.

For the functional factor of scalable content, elements that may increase and/or decrease in size may be formed into a subcomponent to cover future changes. For example, elements that increase and/or decrease in size may include a form that has additional fields and/or a list that may have more items. That is, the fields may increase or decrease in size in the future, and/or the list may increase or decrease in size in the future.

For the functional factor of data containers, elements that present data from an external source may be placed in a subcomponent. In some implementations, if multiple elements contain similar data, a single subcomponent may be formed that is shared for data fetching operations (e.g., a card header, body, footer, or the like). That is, the formed subcomponent may be shared by other subcomponents for data fetching operations.

For the functional factor of a performance value or consideration, elements that appear to load an amount of data that is greater than a predetermined amount, and/or display a graphical interface that requires being backed by a query (e.g., a chart or table) may be formed as a subcomponent by the server.

For the factor of repetition of the set of design factors, the server may identify repeated elements within the component that may be refactored into a subcomponent that is reused a plurality of times. In some implementations, the same tree structure and/or same instance of a design that is identified by the server may be placed in a subcomponent which may be reused as needed.

For the factor of complexity of the set of design factors, the server may quantify the complexity of each component when combining subcomponents. In some implementations, a complexity that is greater than a predetermined value may be selected over components that have a complexity that is less than or equal to the predetermined value. Components having a higher complexity (i.e., a complexity that is greater than the predetermined value) may be more extensible and/or may have more use cases than the lower complexity components (i.e., components that have a complexity that is less than or equal to the predetermined value). In an example, a primitive component may have a complexity of 1 (lowest), and components of a higher complexity may have a value that is greater than 1. In some implementations, the values and/or ranges for the primitive and/or lower complexity components and higher complexity components may be configurable (e.g., by the server, based on input from a user, or the like).

In some implementations, the server may weight one or more of the set of factors for determining when the design elements meet a criteria to be a subcomponent.

In some implementations, a predetermined subtree size (i.e., a minimum size of a subtree of the tree representation generated from the design file in operation 110) may be used to determine whether to form a separate subcomponent. That is, implementations of the disclosed subject matter may not break every subtree into a new component, as too many subcomponents may not be useful. The exceptions to this may be used in some implementations, where there may be a predetermined number of factors indicating that a subcomponent may be formed, such as when there are functional similarities with nearby elements, visual similarities with elements, or the like.

At operation 130, the server may add the design elements to a list of subcomponent candidates that meet at least one of the set of factors to be a subcomponent. That is, elements (i.e., nodes) of the tree representation that meet one or more of the factors described above may be added to a list of subcomponent candidates made by the server 700 and stored in storage 710.

At operation 140, the server may generate a tree structure for the one or more components using the list of subcomponent candidates. That is, the server may generate a new tree structure for a component from the list of subcomponent candidates. At operation 150, the server may name the one or more components of the tree structure with unique names for reusability.

Figure 1B:
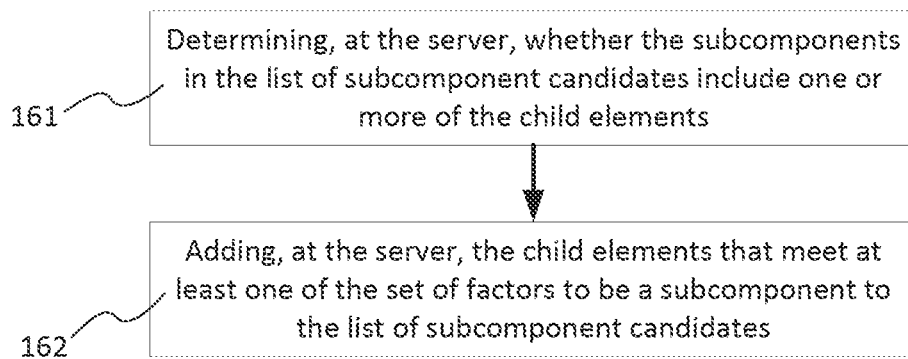

FIG. 1B shows example operations 160 that may be part of method 100 according to implementations of the disclosed subject matter. In operation 161, the server may determine whether the subcomponents in the list of subcomponent candidates include one or more of the child elements. At operation 162, the server may add the child elements that meet at least one of the set of factors to be a subcomponent to the list of subcomponent candidates. Operations 161 and 162 may be performed after determining the list of subcomponent candidates at operation 130.

Figure 1C:
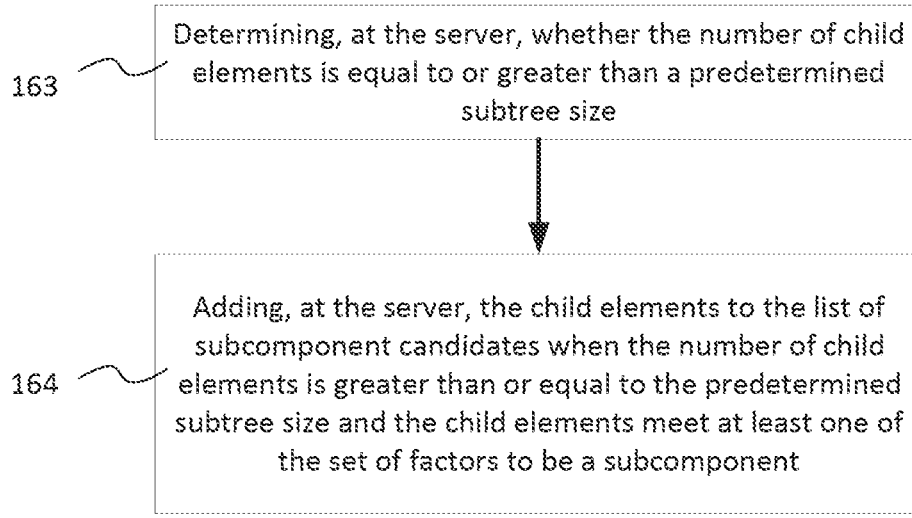

FIG. 1C shows an additional example of operations 160 that may be part of method 100 according to implementations of the disclosed subject matter. At operation 163, the server may determine whether the number of child elements is equal to or greater than a predetermined subtree size. At operation 164, the server may add the child elements to the list of subcomponent candidates when the number of child elements is greater than or equal to the predetermined subtree size and the child elements meet at least one of the set of factors to be a subcomponent. Operations 163 and 164 may be performed after determining the list of subcomponent candidates at operation 130.

Figure 1D:
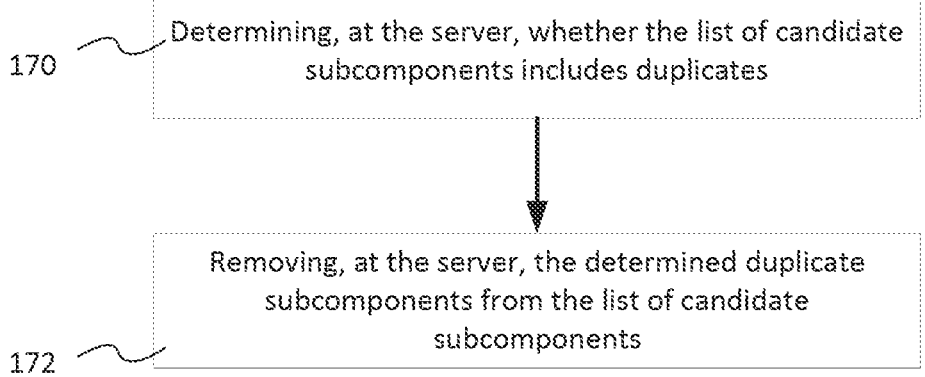

FIG. 1D shows additional example operations of method 100 according to implementations of the disclosed subject matter. At operation 170, the server may determine whether the list of candidate subcomponents includes duplicates. For example, the server may determine whether the list of candidate subcomponents generated at operation 130 include any duplicate subcomponents. At operation 172, the server may remove the determined duplicate subcomponents from the list of candidate subcomponents. Operations 170 and 172 may be performed after operation 130. In some implementations, the server may determine whether any of the subcomponents are similar. For example, the subcomponents may be similar based on having one or more of the set of factors that are the same. In another example, the subcomponents may be similar based on having a predetermined number of elements and/or use cases (e.g., the functional use of the subcomponent in an interface design, or the like) of the subcomponents that are the same. When the server determines that two or more subcomponents are similar, the server may merge the two or more similar subcomponents into a single subcomponent. These additional operations may be performed after operation 130.

Figure 1E:
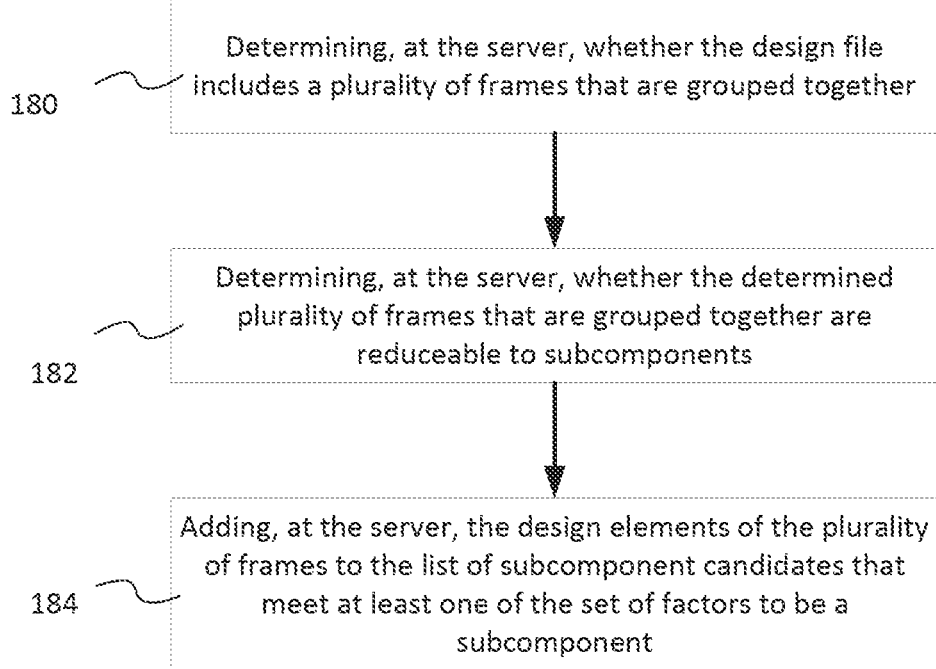

FIG. 1E shows additional example operations of method 100 according to implementations of the disclosed subject matter. At operation 180, the server may determine whether the design file includes a plurality of frames that are grouped together. At operation 182, the server may determine whether the determined plurality of frames that are grouped together are reduceable to subcomponents. At operation 184, the server may add the design elements of the plurality of frames to the list of subcomponent candidates that meet at least one of the set of factors to be a subcomponent. Operations 180, 182, and 184 may be performed after operation 130. For example, operations 180, 182, 184 may be used to evaluate the frames for subcomponents which may be added to the list of potential subcomponents, and then the server may generate a tree structure for the determined subcomponents for the frames at operation 140.

For example, when there are two frames, at least a portion of the page be a shared template, where only a portion of the page is changed between the two frames. In implementations of the disclosed subject matter such as shown in FIG. 1E, common components may be replaced. For example, a top page header, inspection tabs, and/or chart tabs may be common across multiple frames, and may be formed in a subcomponent.

FIGS. 2A-2B show an example of a user interface and of identification of potential subcomponents of the user interface using the example methods shown in FIGS. 1A-1E.

Figure 3:
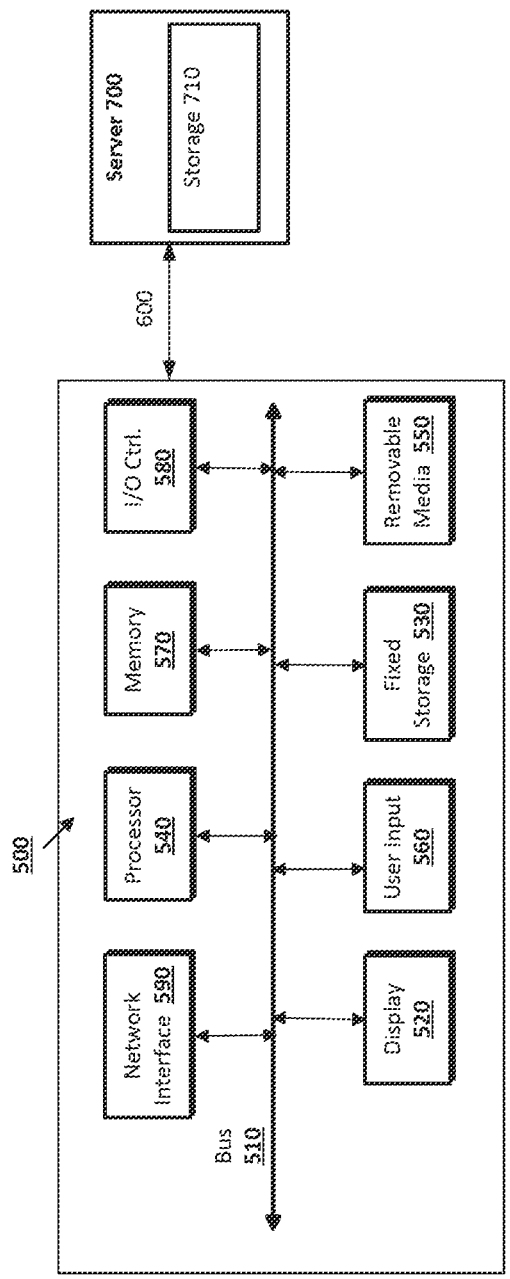
FIG. 3 shows a computer system according to an implementation of the disclosed subject matter.

FIG. 2A shows an example design of a user interface 200 from a design file according to implementations of the disclosed subject matter. The design file may be received by the server 700 from computer 500 via communications network 600 as shown in FIG. 3, and/or may be stored in storage 710. The code of the design file may be parsed and/or converted into a tree representation having nodes as discussed above in connection with operation 110 of FIG. 1A. For example, the tree representation formed by the parsing of the code of the design file may include nodes for a tag name, styling, attributes, and the like, and may include child nodes for one or more of the node of the tree representation. An example tree representation may include the following:

```
{
    TagName: ...
    styling: ...
    attributes: ...
    children: [...]
}
```

FIG. 2B shows an identification of potential subcomponents of the user interface from the design file by the server according to implementations of the disclosed subject matter. For example, the potential subcomponents 202, 204, 206, 208, 210, 212, and/or 214 of the example design of the user interface 200 may be determined by the server 700. The server 700 may parse the design file into a tree representation at operation 110, compare the design elements of the tree representation to a set of factors to determine when the design elements meet a criteria to be a subcomponent at operation 120, and add the subcomponent candidates that meet the set of factors to be a subcomponent at operation 130 to a list of subcomponent candidates as shown in FIG. 1A and described above. One or more of the set of factors may be weighted by the server 700 in determining the subcomponents of the user interface 200 of the design file.

The subcomponent candidates may be processed by the server. For example, when a potential subcomponent of the user interface is different from other subcomponent candidates that is part of the list of subcomponent candidates, the potential subcomponent may be added to the list of subcomponent candidates. The server may determine whether the potential subcomponent is similar to and/or the same as a subcomponent candidate of the list of subcomponent candidates. The potential subcomponent may be similar to a subcomponent candidate when a predetermined number of elements and/or use cases (e.g., the functional use of the subcomponent in an interface design, or the like) of the potential subcomponent are the same as that of a subcomponent candidate of the list of subcomponent candidates. When the potential subcomponent is not similar to and/or the same as a subcomponent candidate, the subcomponent candidate of the list may be updated to satisfy a use case. That is, the subcomponent candidate may be updated to include the features of the potential subcomponent that are different from that of the subcomponent candidate. For example, when the server determines that potential subcomponent A is similar to subcomponent candidate B that is part of the list of subcomponent candidates, but not exactly the same, the subcomponent candidate B may be updated by the server to include the features and/or use cases from potential subcomponent A that are not the same as those of subcomponent candidate B. In another example, the server may determine that potential subcomponents A, B, and C may be similar to one another, but each may have one distinct property and/or feature that makes them unique. Rather than representing these as three distinct subcomponents, implementations of the disclosed subject matter may have the server generate a subcomponent that represents the features, functionality, utility, and/or use cases for subcomponents A, B, and C. When the potential subcomponent is the same as and/or is similar to the subcomponent candidate, there may be no change made to the subcomponent candidate of the list of subcomponent candidate. The processing of the potential subcomponent described above may be used to minimize the number of child subcomponents as detailed in operations 161, 162, 163, and 164 of FIGS. 1B-1C, and may include removing duplicate subcomponents as detailed in operations 170 and 170 of FIG. 1D. The processing of the potential subcomponents described above may be used to minimize and/or reduce the total number of subcomponents.

In some implementations, the server may replace the body of the subcomponents. For example, the subcomponents of the child nodes of the tree representation may be replaced with subcomponent candidates, as shown below:

```
{
    TagName: 'custom-tabs'
    styling: ...
    attributes: ...
    children: [
        '<custom-chart-header />'
        '<custom-chart- />'
        '<custom-chart-legend />',
        ...
    ]
}
```

That is, the 'custom-tabs' subcomponent may be added to the body of the TagName subcomponent, and '<custom-chart-header/>', '<custom-chart-/>', and '<custom-chart-legend/>' may be subcomponents added to the body of the children portion of the component. Unique components may be generated from the subcomponents by uniquely naming the components, and the subcomponents may be placed into the tree structure as discussed above in connection with operations 140 and 150 of FIG. 1A.

Implementations of the presently disclosed subject matter may be implemented in and used with a variety of component and network architectures. FIG. 3 is an example computer 500 suitable for the implementations of the presently disclosed subject matter. As discussed in further detail herein, the computer 500 may be a single computer in a network of multiple computers. In some implementations, the computer 500 may be used to generate a workflow definition and/or display a current state (e.g., a not-started state, an in-progress state, and/or completed state, or the like). As shown in FIG. 3, the computer 500 may communicate with a server 700 (e.g., a server, cloud server, database, cluster, application server, neural network system, or the like) via a wired and/or wireless communications network 600. The server 700 may include a storage device 710. The storage 710 may use any suitable combination of any suitable volatile and non-volatile physical storage mediums, including, for example, hard disk drives, solid state drives, optical media, flash memory, tape drives, registers, and random access memory, or the like, or any combination thereof.

The storage 710 may store data, such as one or more design files, tree representations, subcomponents, one or more lists of potential subcomponents, and the like.

The computer (e.g., user computer, enterprise computer, or the like) 500 may include a bus 510 which interconnects major components of the computer 500, such as a central processor 540, a memory 570 (typically RAM, but which can also include ROM, flash RAM, or the like), an input/output controller 580, a user display 520, such as a display or touch screen via a display adapter, a user input interface 560, which may include one or more controllers and associated user input or devices such as a keyboard, mouse, Wi-Fi/cellular radios, touchscreen, microphone/speakers and the like, and may be communicatively coupled to the I/O controller 580, fixed storage 530, such as a hard drive, flash storage, Fibre Channel network, SAN device, SCSI device, and the like, and a removable media component 550 operative to control and receive an optical disk, flash drive, and the like.

The bus 510 may enable data communication between the central processor 540 and the memory 570, which may include read-only memory (ROM) or flash memory (neither shown), and random access memory (RAM) (not shown), as previously noted. The RAM may include the main memory into which the operating system, development software, testing programs, and application programs are loaded. The ROM or flash memory can contain, among other code, the Basic Input-Output system (BIOS) which controls basic hardware operation such as the interaction with peripheral components. Applications resident with the computer 500 may be stored on and accessed via a computer readable medium, such as a hard disk drive (e.g., fixed storage 530), an optical drive, floppy disk, or other storage medium 550.

The fixed storage 530 can be integral with the computer 500 or can be separate and accessed through other interfaces. The fixed storage 530 may be part of a storage area network (SAN). A network interface 590 can provide a direct connection to a remote server via a telephone link, to the Internet via an internet service provider (ISP), or a direct connection to a remote server via a direct network link to the Internet via a POP (point of presence) or other technique. The network interface 590 can provide such connection using wireless techniques, including digital cellular telephone connection, Cellular Digital Packet Data (CDPD) connection, digital satellite data connection or the like. For example, the network interface 590 may enable the computer to communicate with other computers and/or storage devices via one or more local, wide-area, or other networks.

Many other devices or components (not shown) may be connected in a similar manner (e.g., data cache systems, application servers, communication network switches, firewall devices, authentication and/or authorization servers, computer and/or network security systems, and the like). Conversely, all the components shown in FIG. 6 need not be present to practice the present disclosure. The components can be interconnected in different ways from that shown. Code to implement the present disclosure can be stored in computer-readable storage media such as one or more of the memory 570, fixed storage 530, removable media 550, or on a remote storage location.

Some portions of the detailed description are presented in terms of diagrams or algorithms and symbolic representations of operations on data bits within a computer memory. These diagrams and algorithmic descriptions and representations are commonly used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers, or the like.

It should be borne in mind, however, that all these and similar terms are to be associated with the appropriate physical quantities and are merely convenient labels applied to these quantities. Unless specifically stated otherwise as apparent from the above discussion, it is appreciated that throughout the description, discussions utilizing terms such as "parsing," "traversing," "adding," "generating," "naming," "determining," "removing," "weighting," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

More generally, various implementations of the presently disclosed subject matter can include or be implemented in the form of computer-implemented processes and apparatuses for practicing those processes. Implementations also can be implemented in the form of a computer program product having computer program code containing instructions implemented in non-transitory and/or tangible media, such as hard drives, solid state drives, USB (universal serial bus) drives, CD-ROMs, or any other machine readable storage medium, wherein, when the computer program code is loaded into and executed by a computer, the computer becomes an apparatus for practicing implementations of the disclosed subject matter. Implementations also can be implemented in the form of computer program code, for example, whether stored in a storage medium, loaded into and/or executed by a computer, or transmitted over some transmission medium, such as over electrical wiring or cabling, through fiber optics, or via electromagnetic radiation, wherein when the computer program code is loaded into and executed by a computer, the computer becomes an apparatus for practicing implementations of the disclosed subject matter. When implemented on a general-purpose microprocessor, the computer program code segments configure the microprocessor to create specific logic circuits. In some configurations, a set of computer-readable instructions stored on a computer-readable storage medium can be implemented by a general-purpose processor, which can transform the general-purpose processor or a device containing the general-purpose processor into a special-purpose device configured to implement or carry out the instructions. Implementations can be implemented using hardware that can include a processor, such as a general purpose microprocessor and/or an Application Specific Integrated Circuit (ASIC) that implements all or part of the techniques according to implementations of the disclosed subject matter in hardware and/or firmware. The processor can be coupled to memory, such as RAM, ROM, flash memory, a hard disk or any other device capable of storing electronic information. The memory can store instructions adapted to be executed by the processor to perform the techniques according to implementations of the disclosed subject matter.

The foregoing description, for purpose of explanation, has been described with reference to specific implementations. However, the illustrative discussions above are not intended to be exhaustive or to limit implementations of the disclosed subject matter to the precise forms disclosed. Many modifications and variations are possible in view of the above teachings. The implementations were chosen and described to explain the principles of implementations of the disclosed subject matter and their practical applications, to thereby enable others skilled in the art to utilize those implementations as well as various implementations with various modifications as can be suited to the particular use contemplated.

The invention claimed is:

1. A method comprising:
   parsing, at a server, a design file including code for a user interface, wherein the code is readable by the server into a tree representation having nodes, wherein the nodes represent design elements of the user interface and includes one or more design properties, a unique identifier, and references to child elements of the design elements;
   traversing, at the server, the tree representation and comparing the design elements of the tree representation to a set of factors to determine when the design elements meet a criteria to be a subcomponent for one or more components of the code of the design file;
   adding, at the server, the design elements to a list of subcomponent candidates that meet at least one of the set of factors to be a subcomponent, and removing duplicate subcomponents from the list;
   generating, at the server, a tree structure for the one or more components using the list of subcomponent candidates; and
   naming, at the server, the one or more components of the tree structure with unique names for reusability.

2. The method of claim 1, wherein the one or more design properties include at least one selected from the group consisting of: size of the design elements, position of the design elements, type of the design elements, color of the design elements, and interactions with the design elements.

3. The method of claim 1, further comprising:
   determining, at the server, whether the subcomponents in the list of subcomponent candidates include one or more of the child elements; and
   adding, at the server, the child elements that meet at least one of the set of factors to be a subcomponent to the list of subcomponent candidates.

4. The method of claim 3, further comprising:
   determining, at the server, whether the number of child elements is equal to or greater than a predetermined subtree size; and
   adding, at the server, the child elements to the list of subcomponent candidates when the number of child elements is greater than or equal to the predetermined subtree size and the child elements meet at least one of the set of factors to be a subcomponent.

5. The method of claim 1, wherein the removing duplicate subcomponents from the list comprises:
determining, at the server, whether the list of candidate subcomponents includes duplicates; and
removing, at the server, the determined duplicate subcomponents from the list of candidate subcomponents.

6. The method of claim 1, wherein the set of factors comprises at least one selected from the group consisting of: visualization of the design elements, functional operation of the design elements, repetition of the design elements, and complexity of the design elements.

7. The method of claim 5, wherein the visualization factor includes at least one selected from the group consisting of: accessibility of the design elements, animation of the design elements, transitions of the design elements, spatial relationship of the design elements, patterns of the design elements, variation of state of the design elements, and conditional rendering of the design elements.

8. The method of claim 5, wherein the functional factor includes at least one selected from the group consisting of: user interactive elements of the design elements, scalable content of the design elements, data containers of the design elements, and a performance value of the design elements.

9. The method of claim 1, further comprising:
determining, at the server, whether the design file includes a plurality of frames that are grouped together;
determining, at the server, whether the determined plurality of frames that are grouped together are reduceable to subcomponents; and
adding, at the server, the design elements of the plurality of frames to the list of subcomponent candidates that meet at least one of the set of factors to be a subcomponent.

10. The method of claim 1, further comprising:
weighting, at the server, one or more of the set of factors for determining when the design elements meet a criteria to be a subcomponent.

11. A system comprising:
a server having a processor communicatively coupled to a memory, wherein the server:
parses a design file including code for a user interface, wherein the code is readable by the server into a tree representation having nodes, wherein the nodes represent design elements of the user interface and includes one or more design properties, a unique identifier, and references to child elements of the design elements;
traverses the tree representation and comparing the design elements of the tree representation to a set of factors to determine when the design elements and meet a criteria to be a subcomponent for one or more components of the code of the design file;
adds the design elements to a list of subcomponent candidates that meet at least one of the set of factors to be a subcomponent, and remove duplicate subcomponents from the list;
generates a tree structure for the one or more components using the list of subcomponent candidates; and
names the one or more components of the tree structure with unique names for reusability.

12. The system of claim 11, wherein the one or more design properties include at least one selected from the group consisting of: size of the design elements, position of the design elements, type of the design elements, color of the design elements, and interactions with the design elements.

13. The system of claim 11, wherein the server determines whether the subcomponents in the list of subcomponent candidates include one or more of the child elements, and
wherein the server adds the child elements that meet at least one of the set of factors to be a subcomponent to the list of subcomponent candidates.

14. The system of claim 13, wherein the server determines whether the number of child elements is equal to or greater than a predetermined subtree size, and
wherein the server adds the child elements to the list of subcomponent candidates when the number of child elements is greater than or equal to the predetermined subtree size and the child elements meet at least one of the set of factors to be a subcomponent.

15. The system of claim 11, wherein the server removes duplicate subcomponents from the list by determining whether the list of candidate subcomponents includes duplicates, and removing the determined duplicate subcomponents from the list of candidate subcomponents.

16. The system of claim 11, wherein the set of factors comprises at least one selected from the group consisting of: visualization of the design elements, functional operation of the design elements, repetition of the design elements, and complexity of the design elements.

17. The system of claim 16, wherein the visualization factor includes at least one selected from the group consisting of: accessibility of the design elements, animation of the design elements, transitions of the design elements, spatial relationship of the design elements, patterns of the design elements, variation of state of the design elements, and conditional rendering of the design elements.

18. The system of claim 16, wherein the functional factor includes at least one selected from the group consisting of: user interactive elements of the design elements, scalable content of the design elements, data containers of the design elements, and a performance value of the design elements.

19. The system of claim 11, wherein the server determines whether the design file includes a plurality of frames that are grouped together,
wherein the server determines whether the determined plurality of frames that are grouped together are reduceable to subcomponents, and
wherein the server adds the design elements of the plurality of frames to the list of subcomponent candidates that meet at least one of the set of factors to be a subcomponent.

20. The system of claim 11, wherein the server weights one or more of the set of factors for determining when the design elements meet a criteria to be a subcomponent.

* * * * *